United States Patent
Belmonte et al.

(10) Patent No.: US 10,279,889 B2
(45) Date of Patent: May 7, 2019

(54) DEVICE FOR SUPPLYING HYDRAULIC FLUID TO A RAM AND MECHANISM FOR CONTROLLING THE PITCH OF THE BLADES OF A TURBINE ENGINE PROPELLER COMPRISING THE RAM

(71) Applicant: SNECMA, Paris (FR)

(72) Inventors: Olivier Belmonte, Moissy-Cramayel (FR); Augustin Curlier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 411 days.

(21) Appl. No.: 15/023,479

(22) PCT Filed: Sep. 22, 2014

(86) PCT No.: PCT/FR2014/052354
§ 371 (c)(1),
(2) Date: Mar. 21, 2016

(87) PCT Pub. No.: WO2015/044572
PCT Pub. Date: Apr. 2, 2015

(65) Prior Publication Data
US 2016/0207609 A1    Jul. 21, 2016

(30) Foreign Application Priority Data

Sep. 24, 2013  (FR) ...................................... 13 59183

(51) Int. Cl.
*B64C 11/38*    (2006.01)
*B64D 27/00*    (2006.01)
*F15B 15/14*    (2006.01)

(52) U.S. Cl.
CPC ............ *B64C 11/38* (2013.01); *F15B 15/149* (2013.01); *B64D 2027/005* (2013.01); *Y02T 50/66* (2013.01)

(58) Field of Classification Search
CPC ....... B64C 11/30; B64C 11/38; B64C 11/385; B64C 11/40; B64C 11/42; F15B 15/149; F15B 15/16
(Continued)

(56) References Cited

U.S. PATENT DOCUMENTS

2012/0070291 A1\* 3/2012 Marly ................... B64C 11/385
                                                  416/157 B
2014/0017086 A1   1/2014 Charier et al.

FOREIGN PATENT DOCUMENTS

DE     1 289 638 B    2/1969
DE     93 01 899.1 U1  7/1993
(Continued)

OTHER PUBLICATIONS

International Search Report dated Jan. 7, 2015, issued in corresponding International Application No. PCT/FR2014/052354, filed Sep. 22, 2014, 3 pages.
(Continued)

*Primary Examiner* — Richard A Edgar
*Assistant Examiner* — Elton K Wong
(74) *Attorney, Agent, or Firm* — Christensen O'Connor Johnson Kindness PLLC

(57) ABSTRACT

A hydraulic ram comprising a fixed support, a cylinder that is movable in translation relative to the support, a piston secured inside the cylinder delimiting two chambers with the cylinder and a device for supplying the chambers with hydraulic fluid upstream from the fixed support. The ram is characterized by the fact that the supply device comprises telescopic channels, each telescopic channel comprising two
(Continued)

tubular elements sliding one into the other, a first tubular element being rigidly connected to the fixed support at one end and the second tubular element being rigidly connected to the cylinder at at least two points separated from each other along a generatrix of the cylinder. The invention is applicable to controlling the pitch of the blades of a turbine engine propeller.

19 Claims, 4 Drawing Sheets

(58) Field of Classification Search
USPC .................................................... 92/53, 163
See application file for complete search history.

(56) References Cited

FOREIGN PATENT DOCUMENTS

| GB | 485772 A | 5/1938 |
|----|----------|--------|
| WO | 2012/131271 A1 | 10/2012 |

OTHER PUBLICATIONS

Written Opinion of the International Searching Authority dated Jan. 7, 2015, issued in corresponding International Application No. PCT/FR2014/052354, filed Sep. 22, 2014, 5 pages.

International Preliminary Report on Patentability dated Mar. 29, 2016, issued in corresponding International Application No. PCT/FR2014/052354, filed Sep. 22, 2014, 1 page.

\* cited by examiner

DEVICE FOR SUPPLYING HYDRAULIC FLUID TO A RAM AND MECHANISM FOR CONTROLLING THE PITCH OF THE BLADES OF A TURBINE ENGINE PROPELLER COMPRISING THE RAM

FIELD OF THE DISCLOSURE

Embodiments of the present disclosure relate to the field of hydraulic actuators, in particular actuators having a stationary piston, the member controlled by the actuator being connected to the cylinder, which is translatably movable. Embodiments of the disclosure also relate to the arrangement of the ducts for supplying the chambers of the actuators with hydraulic fluid. Embodiments of the disclosure relate in particular to the use of such actuators in the control of the pitch of the blades of a propeller in an aircraft propulsion engine, such as an engine having unducted propellers.

BACKGROUND

For the purpose of improving the performance and the specific consumption of the propulsion engines of the aircraft, a new architecture is proposed which has a pair of contra-rotating, unducted propellers that are arranged either upstream or downstream of a gas turbine turboshaft engine. The engines are also referred to as "open rotor" engines. For example, the engine described in the patent application FR 2941493 comprises a conventional turboshaft engine gas generator, one or more turbine stages of which drive an unducted fan which extends outside the engine. In a turboshaft engine having a pair of downstream propellers, the rotors can also be mounted on a structural element downstream of the housing and driven by a free turbine by means of a gearbox, for example an epicyclic gearbox.

As in the case of conventional turboprop engines, the propeller blades of the open-rotor engines have a variable pitch, i.e. the pitch of these propellers can be modified during flight in order to change the thrust of the engine and optimize the output of the propeller in accordance with the speed of the aircraft. A number of devices have been conceived in order to vary the pitch of the blades, which devices generally comprise rotating the blade about the main axis thereof by means of conical pinions located below the root of the blade. The pinions engage with conical pinions of a control system.

During the flight phases, the pitch of a propeller changes between two limit boundaries which correspond to a low-pitch position at low travel speeds, for example of approximately 30° relative to the plane of rotation of the propellers, and to a high-pitch position at high speeds, for example of approximately 65° relative to this same plane of rotation of the propellers. The blades can assume a feathered position, which corresponds to a pitch which is greater than that of the high-pitch position and is equal to approximately 90°. In this position, the drag caused by the blades is minimal. The blades can also be placed in the thrust-inverting position and can have a negative pitch angle, −30° for example.

The pitch of the blades can be controlled by means of an actuator, the movable member of which is axially translated and rotates the pivots of the blades about the respective radial axes thereof by means of a suitable linkage which is mounted on a bearing.

Each of the two rotors of the pair of propellers has its own device for driving and for controlling the pitch. For the device of the upstream rotor, some of the stresses are linked to limiting the central space because of the need to provide a passage for the auxiliary systems of the rotor located downstream.

The object of the present disclosure is to provide an arrangement of the device for actuating the blades to rotate about the axis thereof, which arrangement is both compact and strong.

SUMMARY

This object is achieved with a hydraulic actuator comprising a support, a cylinder which is translatably movable relative to the support, a piston which is rigidly connected to the support inside the cylinder and delimits two chambers with the cylinder, and a device for supplying the chambers with hydraulic fluid upstream from the support. This actuator is characterized in that the supply device comprises telescopic pipes, each telescopic pipe comprising two tubular elements which slide one inside the other, a first tubular element being rigidly connected to the support at one end and the second tubular element being rigidly connected to the cylinder at at least two points which are remote from one another along a generatrix of the cylinder, one of the chambers being supplied with fluid via a first telescopic pipe on one portion of the travel of the cylinder and via a second telescopic pipe on the remaining portion of the travel of the cylinder.

The actuator of the disclosure has the advantage of being radially compact in that the pipes for supplying hydraulic fluid are arranged along the outer surface of the movable cylinder. It is furthermore strong and the guidance of the mutually movable parts is well controlled, in particular that of the tubular elements relative to one another. As a result, the operation thereof is not altered when there are dimensional variations resulting from thermal expansion or even when it is subjected to deformations resulting from mechanical stresses during the different flight phases.

The disclosure is particularly beneficial when the actuator is annular and it is necessary to free up space in the interior volume for leading through auxiliary systems intended for equipment located downstream with respect to the support of the actuator.

In accordance with another feature, the first pipe comprises a first closure means which is arranged so as to close the pipe at the end of the travel portion and the second pipe comprises a second closure means which is arranged so as to keep the pipe closed on the travel portion of the cylinder and open on the remaining travel portion of the cylinder.

Advantageously, the closure means of the first or the second pipe is formed by the first tubular element and the second tubular element of the pipe interacting, the second tubular element having a passage connecting the first tubular element to the chamber, and the first tubular element having openings which are uncovered by the passage.

According to one embodiment, the first tubular element is closed at its end and has the openings on the side, and the second tubular element has a portion having such a diameter that the lateral openings are closed and a portion having a wider diameter so as to form the passage. In particular, the second pipe is connected to the chamber by means of a tubular element which is arranged in parallel with the second pipe.

In accordance with another feature, the first tubular elements of the pipes are connected to the support by a swan-neck-shaped portion.

The actuator of the disclosure is used particularly advantageously in a mechanism for controlling the pitch of a variable-pitch propeller. The actuator is rigidly connected, by its support, to the stator of the propeller.

The first pipe supplies fluid to the chamber over a pitch-setting range and the second pipe supplies fluid to the chamber over a thrust-inversion range of the propeller.

In accordance with another feature, the other chamber is supplied with fluid via a third telescopic pipe.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
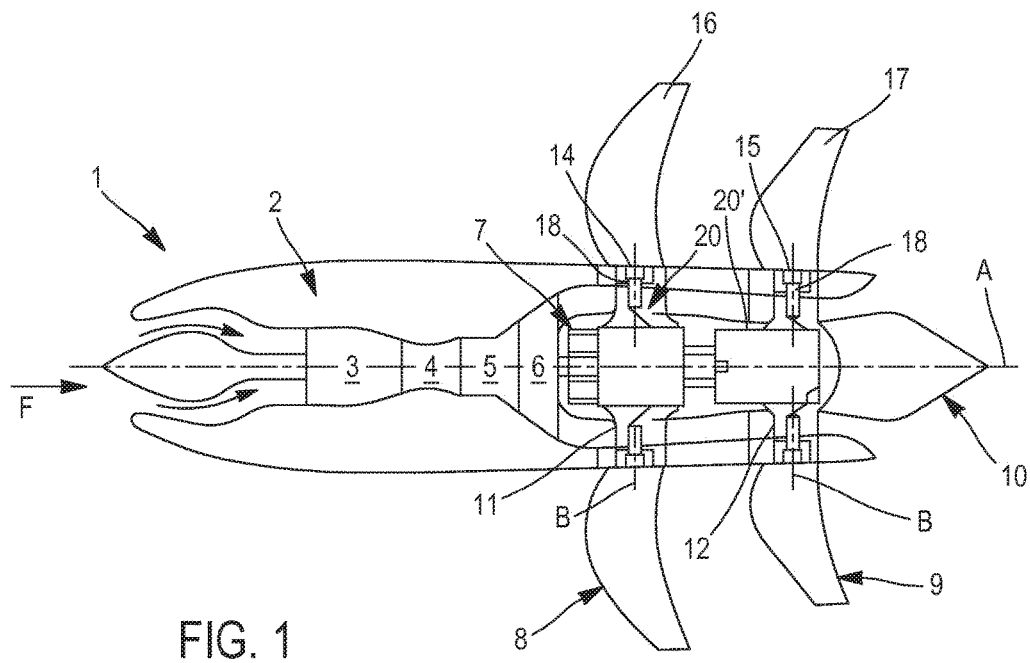
FIG. 1 shows an axial section through an engine having contra-rotating propellers to which the disclosure is applied.

As is schematically shown in FIG. 1, the an unducted fan (open rotor) turboshaft engine 1 having a longitudinal axis A conventionally comprises, from upstream to downstream in the direction of flow of the gas stream F inside a nacelle 2 of the turboshaft engine, one or two compressors 3 according to the architecture of the single-spool or two-spool gas generator, an annular combustion chamber 4, a high-pressure turbine or one high-pressure and one intermediate-pressure turbine 5 according to the architecture, and a low-pressure turbine 6 that drives, by means of a reducer or epicyclic gearbox 7 and in a contra-rotating manner, two propellers, one upstream 8 and one downstream 9, in the direction of the stream F. The propellers are aligned in the longitudinal axis A of the turboshaft engine to form the fan. An exhaust nozzle 10 for ejecting the gases forms the rear body of the engine, in the conventional manner.

The propellers are arranged in radial parallel planes, which are perpendicular to the axis A, and rotate by means of the turbine 6 and the gearbox 7 in opposite directions of rotation. The propellers are mounted in rotary housings 11, 12, for example polygonal-ring housings as described in the patent application FR 12 56 323 of 2 Jul. 2012, filed by this applicant, around which the roots 14, 15 of the blades 16, 17 are mounted.

The blades of the upstream 8 and downstream 9 propellers are of variable pitch. The blades are oriented around the radial pivot axis B thereof by means of suitable respective mechanisms 20 and 20', in such a way as to assume an optimal angular position which is determined on the basis of the operating conditions of the turboshaft engine and the flight phases of the aircraft.

The following description relates to the system 20 for orienting the blades associated with the upstream propeller 8.

Figure 2:
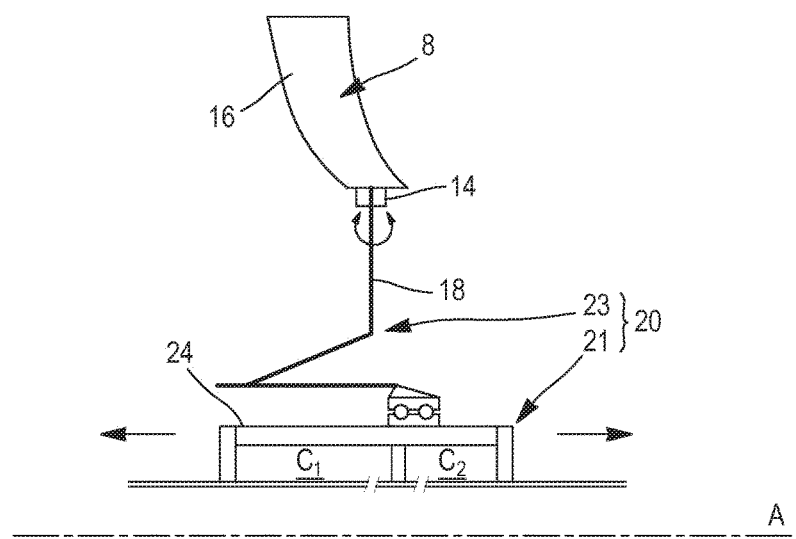
FIG. 2 is a schematic view of pitch control of the blades of a propeller of the engine from FIG. 1.

The orientation system 20, shown in FIG. 2, allows the above-mentioned different operating phases of the upstream propeller 8 to be carried out: rotation of the blades in the two directions with increasing, decreasing and inverse pitch, and returning of the blades to the feathered position in the case of malfunction.

To this end, the system comprises an annular, linear-displacement hydraulic actuator 21 which has an axis A and the translatably movable body 24 of which is formed by the cylinder, the piston of the actuator remaining stationary. The translational movement of the actuator is transmitted by a transmission mechanism 23 which connects the body 24 of the actuator to the radial shafts 18 of the roots 14 of the blades 16 of the propeller 8. This mechanism comprises a bearing, the inner ring of which is rigidly connected to the body 24, and a set of connecting rods which connect the outer ring to the radial shafts, which are thus rotated about their respective axes by the translational movement of the body of the actuator.

Figure 3:
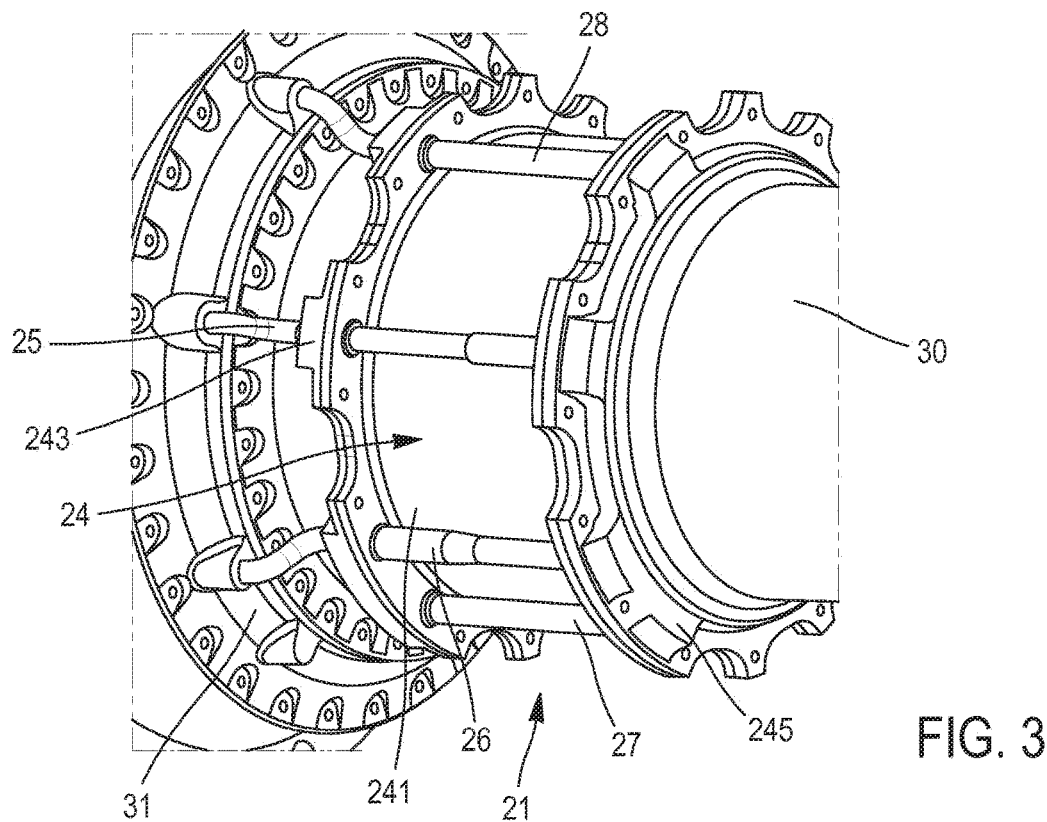
FIG. 3 is a perspective view of the hydraulic actuator of the disclosure.
Figure 4:
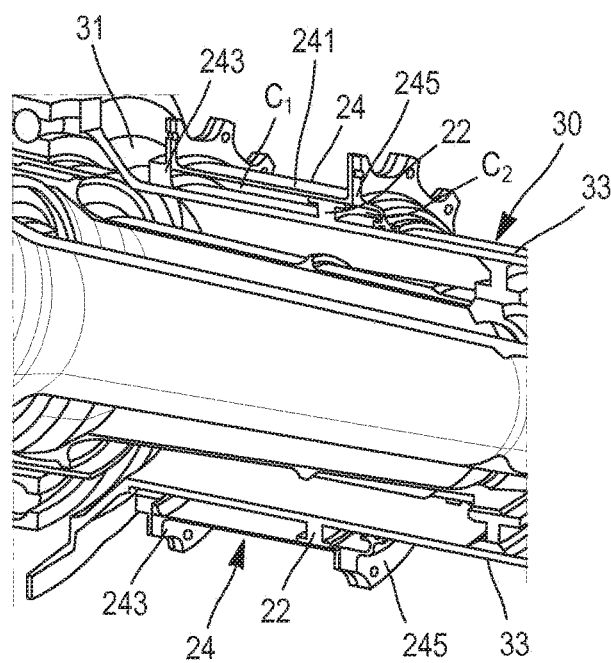
FIG. 4 is an axial sectional view of the actuator from FIG. 3.

FIG. 3 is a perspective view of the exterior of the actuator 21 with its cylinder 24. FIG. 4 is an axial section of the view from FIG. 3, showing the interior. The cylinder 24 is translatably movable on a tubular support 30 which forms the stationary support of the actuator. FIG. 4 shows the interior of the stationary support 30, a portion of the shaft for driving the downstream rotor, and the casing through which the auxiliary systems for the downstream rotor are led through. The stationary support 30 comprises, upstream of the actuator 21, a collar 31, through which the control fluids of the actuator are distributed. The support is referred to as the stationary support because it is rigidly connected to the stator portion of the turboshaft engine.

The actuator 21 therefore comprises a cylinder which, in this embodiment, is formed of a cylindrical portion 241, an upstream cowl 243 and a downstream cowl 245. The cylinder 24 slides on the tubular portion 33 of the stationary support 30. A partition 22 is rigidly connected to this tubular portion 33 and forms two chambers C1 and C2 with the cylinder 24. C1 is the chamber upstream of the side of the collar 31 of the support.

FIG. 3 shows three first tubular elements which are rigidly connected by their end upstream of the collar 31 and four tubular elements which are rigidly connected to the cylinder and via which the two chambers C1 and C2 are respectively supplied with fluid.

Figure 6:
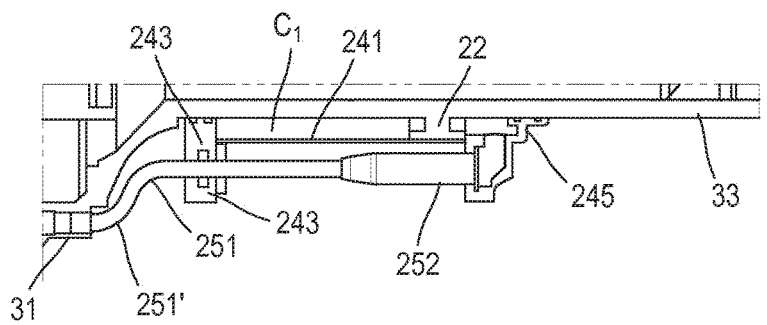
FIGS. 6 to 8 are partial longitudinal views of the actuator from FIG. 3 in the region of the low-pitch first pipe, in the different operating phases of the actuator.
Figure 7:
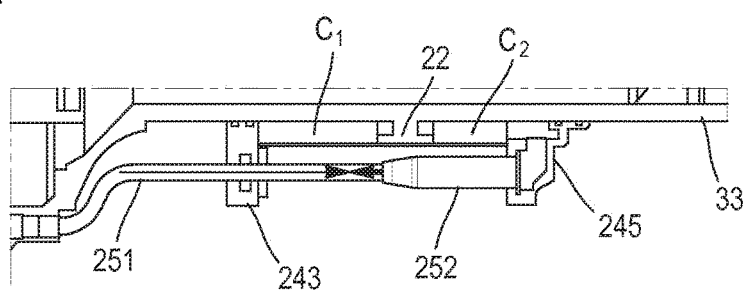
Figure 8:
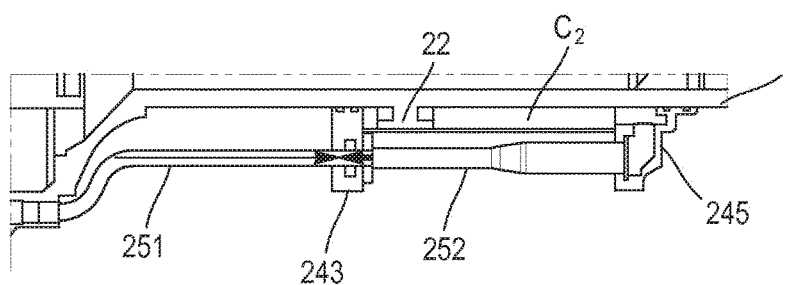

In FIGS. 6 to 8, a first pipe, referred to as a low-pitch pipe 25, is formed of a first low-pitch tubular element 251 and a second low-pitch tubular element 252. The first low-pitch tubular element is rigidly connected to the collar 31, through which it is supplied with hydraulic fluid and slides inside the second low-pitch tubular element 252, which is rigidly connected to the cylinder 24 and communicates with the chamber C2, in the downstream direction.

Figure 5:
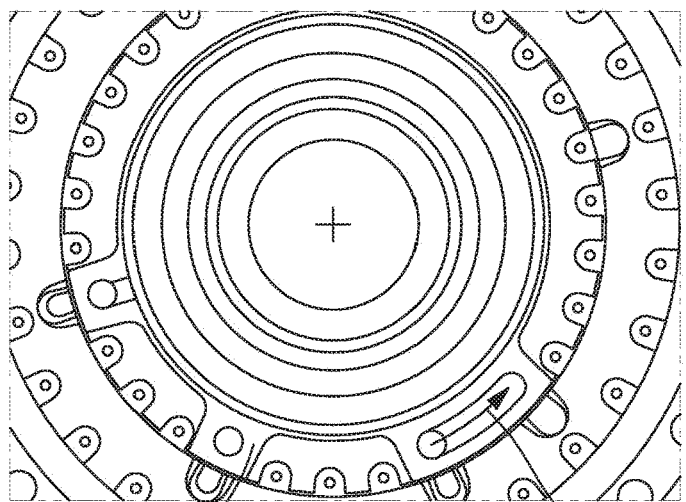
FIG. 5 is a cross section through the actuator from FIG. 3 in the region of the upstream cowl.
Figure 9:
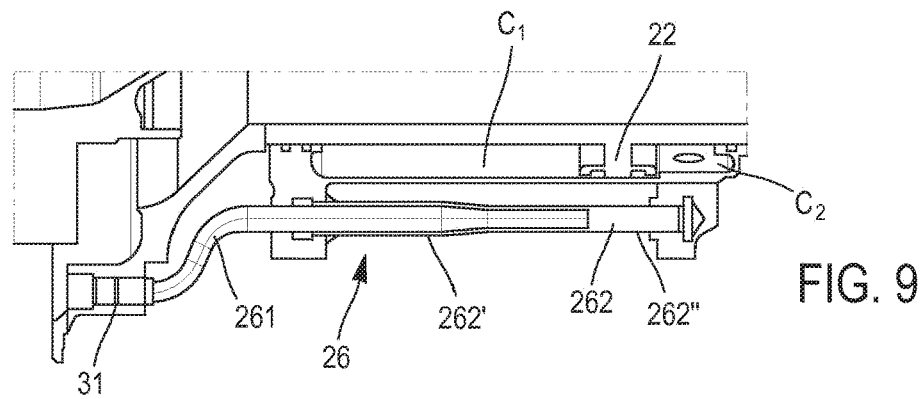
FIG. 9 is a partial longitudinal section of the actuator from FIG. 3 in the region of the second, inverse-pitch pipe.
Figure 10:
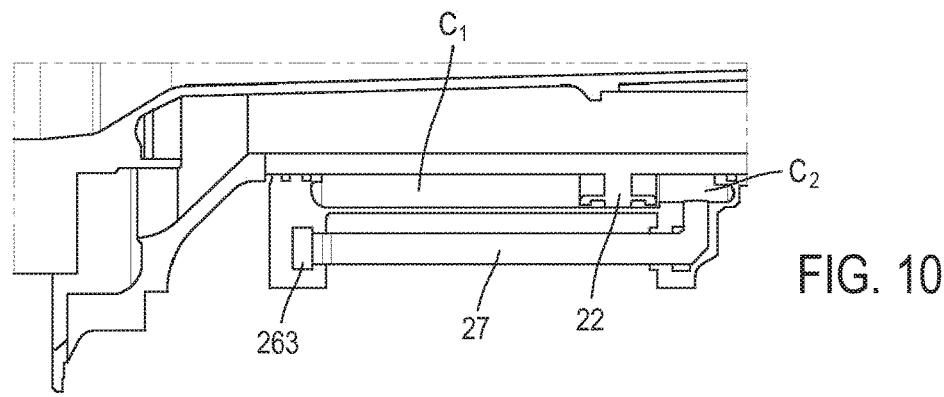
FIG. 10 is a partial longitudinal section of the actuator from FIG. 3 in the region of the bypass pipe.

In FIG. 9, a second pipe, referred to as an inverse-pitch pipe 26, is formed of a first inverse-pitch tubular element 261 and a second inverse-pitch tubular element 262. The first inverse-pitch tubular element 261 is rigidly connected to the collar 31, through which it is supplied with hydraulic fluid and slides inside the second inverse-pitch tubular element 262, which is rigidly connected to the cylinder 24 and communicates with the chamber C2, in the downstream direction. The second tubular element communicates with the chamber C2 by means of a pipe 27, referred to as a bypass pipe, the functioning of which will be explained below. The second inverse-pitch tubular element 262 communicates with the pipe 27 in the region of the upstream cowl 243 via a channel 263, as can be seen in the cross section of FIG. 3 shown in FIG. 5.

A third pipe, referred to as a high-pitch pipe 28, is formed of a first high-pitch tubular element 281 and a second high-pitch tubular element 282. The first high-pitch tubular element 281 is rigidly connected to the collar 31, through which it is supplied with hydraulic fluid and slides inside the second high-pitch tubular element 282, which is rigidly connected to the cylinder 24 and communicates with the chamber C1, in the upstream direction.

The three first tubular elements 251, 261 and 281 are fixed by any suitable means in their respective recesses made in the collar 31. The elements communicate with a pressurized-fluid source by means of control members which are not described here.

The three second tubular elements 252, 262 and 282 and the bypass pipe 27 are rigidly connected to the cylinder 24 and, in accordance with one feature of the disclosure, are in each case held on the cylinder 24 at two points on a generatrix thereof which are remote from one another. More particularly, the two points are located at their ends, in this case in region of the upstream and downstream cowls 243 and 245, respectively. Other embodiments of the installation of the second tubular elements are possible; for example the second tubular elements may be machined at least in part inside one of the elements forming the cylinder.

The advantage of the solution of the disclosure is to ensure, for each pipe, efficient guiding of the first tubular element when it slides inside the second tubular element. When the aircraft is in flight, the stationary support 30 and the set of parts of the structure of the engine are subjected to stresses which can alter the axial orientation of one part with respect to the other; for example the tubular portion 33 of the support 30 may bend with respect to the collar 31. Without this guiding, the relative deformations of the parts could block the movement of the cylinder relative to the stationary support.

It should be noted that the first tubular elements are connected to the collar by means of a swan-neck-shaped tube portion having two bends. This is a result of the difference in diameter between the cylinder 24 and the fluid-dispensing outlets arranged on the collar 31. This arrangement has the advantage of enabling the differences in expansion and other deformations between the first tubular elements 251, 261 and 281 and the other parts to be absorbed locally.

The operating mode of this assembly and how the two chambers are supplied with fluid in the different flight phases of the aircraft on which the turboshaft engine is mounted, so as to ensure reliable functioning of the mechanism for controlling the pitch of the blades, will now be explained.

Increasing the volume in the downstream chamber C2 causes the cylinder 24 to be displaced to the right relative to the stationary partition 22, as shown in the drawings. This displacement corresponds, on one portion of the travel of the cylinder, to a reduction in the pitch of the blades, which during normal operation proceeds from high pitch to low pitch in flight, then to an adjustment of the low pitch on the ground between for example 65°, 30° and 0°, then, on the remaining portion of the travel of the cylinder, to the movement into the inverse position, at −30° for example, when the thrust produced by the propeller is reversed in order to support the braking on the ground upon landing.

In accordance with another feature of the disclosure, the solution described below ensures that the movement from the positive pitch of the blades in the thrust-inverting position cannot be achieved involuntarily or by accident.

FIG. 6 shows on the left-hand side of the drawing the position of the actuator in abutment, corresponding to a high pitch in the feathered position, at 90°. The drawing shows a safety pitch which aims to reduce the drag of the propeller when the pitch control system fails. When the actuator 24 moves from this position towards the right, the pitch angle reduces to become negative, passing through 0°, which is the plane of rotation of the propeller. More specifically, this drawing shows a longitudinal section along the first low-pitch pipe 25. It should be noted that the first low-pitch tubular element 251 slides into the second low-pitch tubular element 252.

FIG. 7 shows that the actuator has been displaced towards the right. This is the pitch position at 0° and an operating abutment. Between FIG. 6 and FIG. 7, the hydraulic fluid has come from the first tubular element 251 into the chamber C2. A radial slot made in the downstream cowl 245 ensures the passage of fluid from the second tubular element 252 to the chamber C2. A closure means of the first low-pitch pipe has been provided to prevent the extreme positive-pitch position being passed towards negative pitches in this operating phase. Indeed, this prevents a thrust inversion from being controlled in an untimely manner; see FIGS. 6 to 8.

Figure 12:
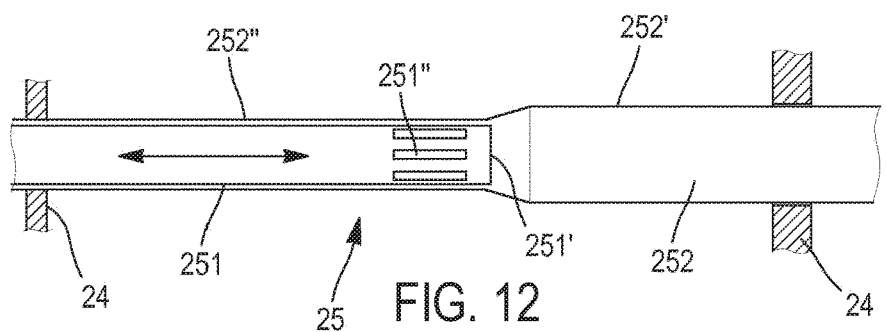
FIG. 12 is a schematic view of the closure means of the first pipe.

Advantageously, this means for closing the low-pitch pipe is produced in a simple manner in the following way and as shown in FIG. 12.

The first tubular element 251 is closed at its end 251' opposite the collar 31. The element has lateral slots 251" in the vicinity of the collar, as is shown in FIG. 12. Furthermore, the second tubular element 252 has two portions of different diameters, and the first portion 252' has a diameter greater than that of the first tubular element 251. In this way, the slots are free and the fluid can flow from the first tubular element 251 to the second tubular element 252 and more specifically to the widened portion 252' of this element. Thus, in the pitch range between 90° and 0°, the downstream chamber C2 is supplied with fluid via the first low-pitch pipe 25. When the pitch reaches 0°, the pipe 25 closes because the slots 251" are closed by the portion 252" of small diameter of the second tubular element 252. Regardless of the pressure applied to the first tubular element, the pressure is no longer transmitted to the downstream chamber C2, the volume of which does not increase.

Passing this position corresponds to a movement directly to pitch inverter. This is only controlled by the second pitch-inversion pipe 262 in conjunction with the bypass pipe 27.

The inverse-pitch pipe 26 has the same structure as the first pipe, but is reversed from upstream to downstream. The second tubular element 262 has a portion 262' having a large diameter and a portion 262" having a small diameter. Whereas the first tubular element has its end closed while having lateral slots, the closure means is thus similar to that of the first pipe, but in reverse. During the pitch adjustment phase, the pipe is closed when the portion 262" of small diameter of the second tubular element 262 closes the lateral slots in the first tubular element 261. The two means for closing the pipes 25 and 26 are coordinated such that during the displacement, for example towards a pitch of 0°, the closure of one corresponds to the opening of the other. It follows therefrom that when the pitch is in abutment at the 0° position, a positive action is required in order to be able to move to the inverted position, and vice versa. This positive action results in the control of the inverse pitch via the second pipe 26.

When the control moves to the inverted position, the hydraulic fluid passes through the inverse-pitch pipe 26 and then through the bypass pipe to supply the downstream chamber C2 with fluid. By means of the arrangement of the disclosure, the movement into the inverted position implies that the actuator has first reached the position at 0° and then receives a supply at the specific inverse pitch pressure via the second inverse-pitch pipe 26. The fluid passes through the pipe 26 via the tubular element 261 and then via the lateral slots in the element 261 towards the portion 262' of larger diameter of the tubular element 262, to the pipe 27 via the bypass channel 263; see FIG. 5. FIG. 8 shows that the actuator is moved towards the right although the pipe 25 is closed. The supply of fluid to the chamber has been made possible by the inverse-pitch pipe 26 in conjunction with the bypass pipe 27.

Figure 11:
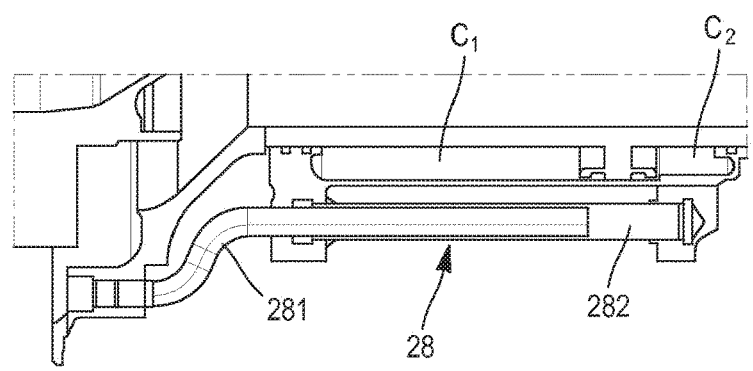
FIG. 11 is a partial longitudinal section of the actuator from FIG. 3 in the region of the high-pitch pipe.

FIG. 11 shows the third pipe, referred to as a high-pitch pipe 28. The first tubular element 281 of the pipe 29 slides inside the tubular element 282 in order to supply the upstream chamber C1 with fluid. This is to return the pitch from the thrust-inversion pitch to the feathering position. If need be, the fluid coming from the upstream control device is guided inside the element 281 and then between the element and the second tubular element 282, which has the larger diameter.

The disclosure thus obtains a system for controlling the pitch of a propeller that is compact yet does not occupy a lot of space radially, while at the same time has a central space that is sufficient for other pipes to pass through. This system is strong because it is less sensitive in its structure to dimensional variations and to axial bending. Finally, it ensures reliable functioning.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A hydraulic actuator comprising:
   a support;
   a cylinder translatably movable relative to the support along a path of travel;
   a piston rigidly connected to the support inside the cylinder, wherein the piston delimits first and second chambers with the cylinder; and
   a supply device configured for supplying the first and second chambers with hydraulic fluid upstream from the support, wherein the supply device comprises telescopic pipes, each telescopic pipe comprising two tubular elements which slide one inside the other, a first tubular element being rigidly connected to the support at one end and the second tubular element being rigidly connected to the cylinder at at least two points which are remote from one another along a generatrix of the cylinder, one of said first and second chambers being supplied with fluid via a first telescopic pipe along a portion of the path of travel of the cylinder and via a second telescopic pipe along the remaining portion of the path of travel of the cylinder.

2. The hydraulic actuator according to claim 1, wherein the first pipe comprises a first closure means which is arranged so as to close the pipe at the end of said portion of the path of travel of the cylinder and the second pipe comprises a second closure means which is arranged so as to keep the second pipe closed during said portion of the path of travel of the cylinder and open during said remaining portion of the path of travel of the cylinder.

3. The hydraulic actuator according to claim 2, wherein the closure means of the first or the second pipe is formed by the first tubular element and the second tubular element of said pipe interacting, the second tubular element having a passage connecting the first tubular element to one of said first and second chambers, and the first tubular element having openings.

4. The hydraulic actuator according to claim 3, wherein the first tubular element is closed at an end opposite a collar and said openings of the first tubular element are lateral openings formed in a sidewall thereof, wherein the second tubular element has a first portion having a first diameter and a second portion having a second, wider diameter, so that if the second tubular element is positioned with respect to the first tubular element in a telescoping manner, the first portion of the second tubular element is capable of closing said lateral openings and the second portion of the second tubular element is capable of forming said passage.

5. The hydraulic actuator according to claim 3, wherein said openings of the first tubular element are in fluid communication with the passage.

6. The hydraulic actuator according to claim 3, wherein the first tubular element has a closed end opposite a collar.

7. The hydraulic actuator according to claim 6, wherein said openings of the first tubular element are configured to open laterally outwardly with respect to the closed end of the first tubular element.

8. The hydraulic actuator according to claim 3 wherein the second tubular element has a first portion having a first diameter and a second portion having a second, wider diameter, so that if the second tubular element is positioned with respect to the first tubular element in a telescoping manner, the first portion of the second tubular element is capable of closing said openings and the second portion of the second tubular element is capable of forming said passage.

9. The hydraulic actuator according to claim 1, wherein the second pipe is connected to one of said first and second chambers by a pipe which is arranged in parallel with the second pipe.

10. The hydraulic actuator according to claim 1, wherein the first tubular elements of the pipes are connected to the support by a swan-neck-shaped portion.

11. A mechanism for controlling the pitch of a variable-pitch propeller, comprising an actuator according to claim 1, the actuator being rigidly connected to the stator portion of the propeller.

12. The mechanism according to claim 11, wherein the first pipe is a low-pitch pipe, and supplies one of said first and second chambers with fluid over a pitch-setting range, and the second pipe is a pitch-inversion pipe, supplying one of said first and second chambers with fluid over a thrust-inversion range of the propeller.

13. The mechanism according to claim 11, wherein the first pipe is a low-pitch pipe, and supplies one of said first and second chambers with fluid over a pitch-setting range, and the second pipe is a pitch-inversion pipe, supplying said one of said first and second chambers with fluid over a thrust-inversion range of the propeller.

14. The mechanism according to claim 13, wherein the other chamber of said first and second chambers is supplied with fluid via a third telescopic pipe, which is a high-pitch pipe, having a first tubular element and which is rigidly connected to the support and a second tubular element which communicates with said other chamber.

15. The hydraulic actuator according to claim 1, wherein the first pipe is configured and arranged to open the first pipe during the portion of the path of travel of the cylinder such that fluid is permitted to enter said one of said first and second chambers and to close the first pipe at the end of the portion of the path of travel of the cylinder such that fluid is restricted from entering said one of said first and second chambers during the remaining portion of the path of travel of the cylinder.

16. The hydraulic actuator according to claim 1, wherein the second pipe is configured and arranged to close the second pipe during the portion of the path of travel of the cylinder such that fluid is restricted from entering said one of said first and second chambers and to open during said remaining portion of the path of travel of the cylinder such that fluid is permitted to enter said one of said first and second chambers.

17. A combination, comprising:

a variable-pitch propeller having a stator portion; and a hydraulic actuator being rigidly connected to the stator portion of the variable-pitch propeller, wherein the hydraulic actuator comprises:

a support;

a cylinder translatably movable relative to the support along a path of travel comprising a first phase that corresponds to a pitch adjustment position of the propeller and a second phase that corresponds to a thrust inversion position of the propeller;

a piston rigidly connected to the support inside the cylinder, wherein the piston delimits an upstream chamber and a downstream chamber within the cylinder; and a supply device configured to supply the upstream and downstream chambers with hydraulic fluid, wherein the supply device comprises a plurality of telescopic pipes, each telescopic pipe comprising two tubular elements which slide one inside the other, a first tubular element being rigidly connected to the support at one end and the second tubular element being rigidly connected to the cylinder at at least two points which are remote from one another along a generatrix of the cylinder, the downstream chamber being supplied with fluid via a first telescopic pipe along the first phase of the path of travel of the cylinder and via a second telescopic pipe along the second phase of the path of travel of the cylinder.

18. The combination according to claim 17, wherein the upstream chamber is supplied with fluid via a third telescopic pipe, the third pipe having a first tubular element rigidly connected to the support and a second tubular element which communicates with said upstream chamber.

19. The combination according to claim 17, wherein the upstream chamber is supplied with fluid to transition the pitch of the propeller from a thrust inversion position to a feathering position.

* * * * *